(12) United States Patent
Uribe et al.

(10) Patent No.: US 11,279,310 B1
(45) Date of Patent: Mar. 22, 2022

(54) AIRBAG MOUNTING ASSEMBLY

(71) Applicants: ZF Passive Safety Systems US Inc., Washington, MI (US); Dalphi Metal Espana, S.A., Vigo (ES)

(72) Inventors: Ernesto Uribe, Macomb, MI (US); Miguel Sobradelo Sineiro, Sisan Ribadumia (ES); Pedro Lorenzo Rodriguez, Medina del Campo (ES)

(73) Assignees: ZF PASSIVE SAFETY SYSTEMS US INC., Washington, MI (US); DALPHI METAL ESPANA S.A., Vigo (ES)

( * ) Notice: Subject to any disclaimer, the term of this patent is extended or adjusted under 35 U.S.C. 154(b) by 0 days.

(21) Appl. No.: 17/030,450

(22) Filed: Sep. 24, 2020

(51) Int. Cl.
*B60R 21/232* (2011.01)
*B60R 21/213* (2011.01)
*B60R 21/237* (2006.01)
*B60R 21/00* (2006.01)
*B60R 21/231* (2011.01)

(52) U.S. Cl.
CPC .......... *B60R 21/213* (2013.01); *B60R 21/232* (2013.01); *B60R 21/237* (2013.01); *B60R 2021/0018* (2013.01); *B60R 2021/23192* (2013.01)

(58) Field of Classification Search
CPC ... B60R 21/232; B60R 21/213; B60R 21/201; B60R 21/214; B60R 21/23138; B60R 2021/0018; B60R 2021/23192
USPC ................................. 280/728.2, 730.1, 730.2
See application file for complete search history.

(56) References Cited

U.S. PATENT DOCUMENTS 9,321,417 B1 * 4/2016 Lepper .................. B60R 21/201
2020/0282945 A1 * 9/2020 McKeon ............... B60R 21/214

* cited by examiner

*Primary Examiner* — Keith J Frisby
(74) *Attorney, Agent, or Firm* — Tarolli, Sundheim, Covell & Tummino LLP

(57) ABSTRACT

An apparatus for connecting a curtain airbag to a vehicle includes a fabric mounting portion formed from or connected to the curtain airbag. The fabric mounting portion has a fastener retainer for retaining a fastener in the mounting portion during installation of the curtain airbag in the vehicle. The fastener retainer is formed from the mounting portion fabric and defined by one or more slots that extend through the mounting portion fabric, leaving the fastener retainer connected to the remainder of the mounting portion by one or more tabs. The mounting portion also has a retainer opening extending through the fastener retainer and sized to form an interference fit with the fastener so that the fastener retainer holds the fastener. The one or more tabs in combination with the one or more slots permits the fastener retainer to move relative to the remainder of the mounting portion.

19 Claims, 8 Drawing Sheets

AIRBAG MOUNTING ASSEMBLY

FIELD OF THE INVENTION

The invention relates to an apparatus for helping to protect an occupant of a vehicle. More particularly, the invention relates to a curtain airbag inflatable between a vehicle occupant and a side structure of a vehicle and means for mounting the curtain airbag to the vehicle.

BACKGROUND OF THE INVENTION

It is known to inflate an inflatable vehicle occupant protection device to help protect a vehicle occupant in the event of a vehicle collision. One particular type of inflatable vehicle occupant protection device is a curtain airbag that is fixed to the roof of the vehicle and/or to a support structure adjacent to the roof of the vehicle. The curtain airbag is configured to inflate from the roof of the vehicle downward inside the passenger compartment in the event of a side impact or a vehicle rollover. The curtain airbag, when inflated, is positioned between a vehicle occupant and the side structure of the vehicle.

There is a constant drive in vehicle manufacturing to cut down on the costs associated with assembling and installing inflatable curtains in vehicles without reducing the effectiveness of the airbags. Reducing the number of parts required to assemble and install curtain airbags can result in a reduction of product and labor costs.

SUMMARY OF THE INVENTION

According to one aspect, an apparatus for connecting a curtain airbag to a vehicle includes a fabric mounting portion formed from or connected to the curtain airbag. The apparatus also includes a fastener for mounting the curtain airbag to the vehicle. The mounting portion comprises a fastener retainer for retaining the fastener in the mounting portion during installation of the curtain airbag in the vehicle. The fastener retainer is formed from the mounting portion fabric and defined by one or more slots that extend through the mounting portion fabric, leaving the fastener retainer connected to the remainder of the mounting portion by one or more tabs. The mounting portion also comprises a retainer opening extending through the fastener retainer and sized to form an interference fit with the fastener so that the fastener retainer holds the fastener. The one or more tabs in combination with the one or more slots permits the fastener retainer to move relative to the remainder of the mounting portion.

According to another aspect, alone or in combination with any other aspect, the mounting portion can comprise a mounting tab formed from airbag fabric extending from an upper edge of the curtain airbag. The mounting tab can comprise first and second overlying layers of the airbag fabric. At least one of the first and second overlying layers can have an opening extending therethrough for receiving the fastener.

According to another aspect, alone or in combination with any other aspect, the first overlying layer can have the opening extending therethrough for receiving the fastener. The second overlying layer can have the fastener retainer formed therein.

According to another aspect, alone or in combination with any other aspect, a shank of the fastener can extend through the opening in the first overlying layer and the retainer opening. A diameter of the opening in the first overlying layer can permit the shank of the fastener to pass through freely. A diameter of the retainer opening can be sized to form an interference with the shank.

According to another aspect, alone or in combination with any other aspect, the one or more tabs in combination with the one or more slots can permit the fastener retainer to move relative to the remainder of the mounting tab. As a result of the fastener retainer being movable relative to the mounting tab, the fastener can be movable relative to the mounting tab while the retainer opening retains the fastener extending through the mounting tab.

According to another aspect, alone or in combination with any other aspect, the mounting portion further can comprise a reinforcement tab formed from a separate length of fabric material and comprising first and second overlying layers. The first overlying layer of the reinforcement tab can have an opening for receiving the fastener. The second overlying layer of the reinforcement tab can have the fastener retainer formed therein. The reinforcement tab can be connected to the mounting tab so that the fastener extends through each of the mounting and reinforcement tabs.

According to another aspect, alone or in combination with any other aspect, each of the first and second overlying layers can have openings extending therethrough for receiving the fastener. Diameters of the openings in the first and second overlying layers can permit a shank of the fastener to pass through freely. A diameter of the retainer opening can be sized to form an interference with the shank.

According to another aspect, alone or in combination with any other aspect, the fastener, as a result of the fastener retainer being movable relative to the remainder of the mounting portion, can be movable relative to the remainder of the mounting portion while the retainer opening retains the fastener in the mounting portion.

According to another aspect, alone or in combination with any other aspect, the mounting portion can further include a reinforcement tab formed from a separate length of fabric material that is connected to the curtain airbag. The reinforcement tab can have the fastener retainer formed therein.

According to another aspect, alone or in combination with any other aspect, the fastener retainer can be defined by a pair of slots that extend through the mounting portion fabric. The fastener retainer can be movable between the slots relative to the remainder of the mounting portion.

According to another aspect, alone or in combination with any other aspect, each slot can have upper and lower ends that are straight or linear and a central portion that has a curved configuration. The fastener retainer can be defined by the central portions of the slots to have a circular configuration. The one or more tabs can be defined by the upper and lower ends of the slots to be upper and lower tabs.

According to another aspect, alone or in combination with any other aspect, the fastener, as a result of the fastener retainer being movable relative to the remainder of the mounting portion, can be movable relative to the remainder of the mounting portion while the fastener retainer retains the fastener in the mounting portion.

According to another aspect, alone or in combination with any other aspect, the pair of slots can define upper and lower tabs that connect the fastener retainer to the remainder of the mounting portion.

According to another aspect, alone or in combination with any other aspect, the apparatus can further include a mounting bracket. The mounting bracket can comprise a plate having oppositely facing first and second surfaces and an opening extending between the first and second surfaces for receiving the fastener. The mounting bracket can have at least one leg extending from the second surface of the plate. The at least one leg can be configured to be received in and extend beyond the one or more slots so that a portion of the at least one leg contacts the vehicle when the curtain airbag is mounted to the vehicle.

According to another aspect, alone or in combination with any other aspect, the fastener retainer can be defined by a plurality of slots that extend through the mounting portion fabric, leaving the fastener retainer connected to the remainder of the mounting portion by a plurality of tabs. The mounting bracket can have a plurality of legs. Each of the legs can be separated from an adjacent leg by a slot in the mounting bracket. The tabs can be configured to be received in the slots of the mounting bracket when the legs are received in the slots in the mounting portion fabric.

According to another aspect, alone or in combination with any other aspect, the apparatus can further include a package holder having a holding portion for holding the curtain airbag in a rolled and/or folded condition and a mounting portion for mounting the curtain airbag to the vehicle. The mounting portion of the package holder can be adjacent to the mounting portion fabric when joined to the curtain airbag. The at least one leg of the mounting bracket can be configured to extend through the one or more slots and the mounting portion of the package holder so that a portion of the at least one leg contacts the vehicle when the curtain airbag is mounted to the vehicle.

According to another aspect, alone or in combination with any other aspect, an apparatus for connecting a curtain airbag to a vehicle can include a fabric mounting portion formed from or connected to the curtain airbag. The apparatus can include a fastener for mounting the curtain airbag to the vehicle. The apparatus can also include a mounting bracket comprising a plate having oppositely facing first and second surfaces and an opening extending between the first and second surfaces for receiving the fastener. The mounting bracket can have at least one leg extending from the second surface of the plate. The mounting portion can comprise a fastener retainer for retaining the fastener in the mounting portion during installation of the curtain airbag in the vehicle. The fastener retainer can be formed from the mounting portion fabric and defined by one or more slots that extend through the mounting portion fabric, leaving the fastener retainer connected to the remainder of the mounting portion by one or more tabs. The mounting portion can also comprise a retainer opening extending through the fastener retainer and sized to form an interference fit with the fastener so that the fastener retainer holds the fastener. The at least one leg of the mounting bracket can be configured to be received in and extend beyond the one or more slots so that a portion of the at least one leg contacts the vehicle when the curtain airbag is mounted to the vehicle.

According to another aspect, alone or in combination with any other aspect, the fastener retainer can be defined by a plurality of slots that extend through the mounting portion fabric, leaving the fastener retainer connected to the remainder of the mounting portion by a plurality of tabs. The mounting bracket can have a plurality of legs. Each of the legs can be separated from an adjacent leg by a slot in the mounting bracket. The tabs can be configured to be received in the slots of the mounting bracket when the legs are received in the slots in the mounting portion fabric.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
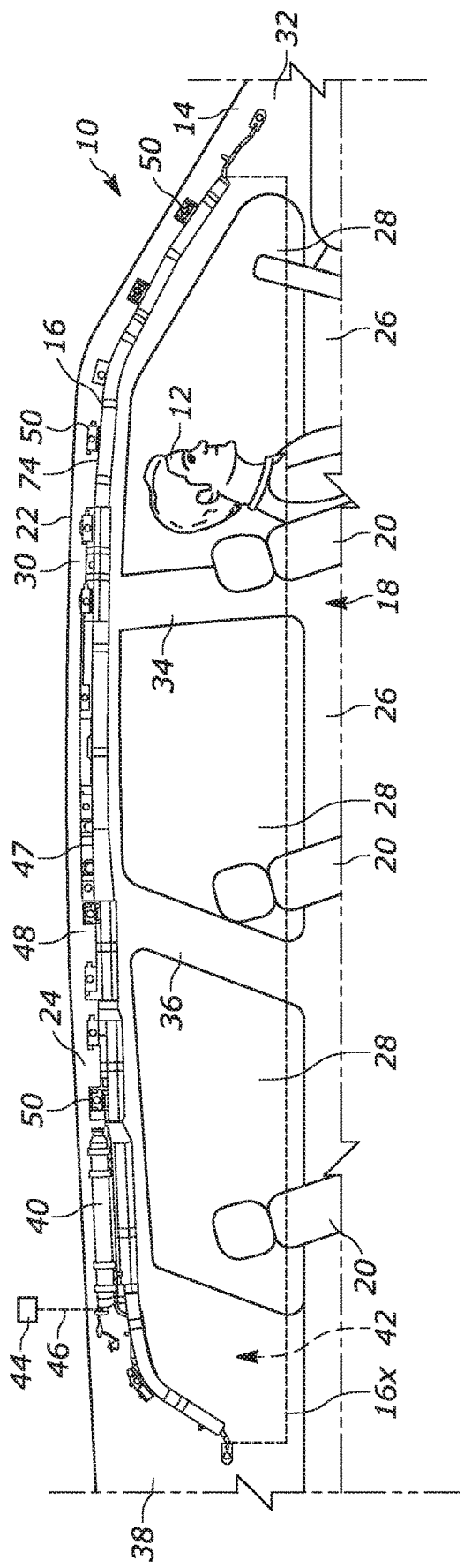
FIG. 1 is a schematic side view illustrating an apparatus for helping to protect an occupant of a vehicle.

An apparatus 10 for helping to protect an occupant 12 of a vehicle 14 includes an inflatable vehicle occupant protection device 16 in the form of an airbag, such as a curtain airbag, for helping to protect the occupant in the event of a side impact to the vehicle. In the embodiment illustrated in FIG. 1, the curtain airbag 16 is shown on the driver side 18 of the vehicle 14 for helping to protect driver side vehicle occupants. Those skilled in the art will appreciate that the apparatus 10 disclosed herein could be adapted for use on a passenger side (not shown) of the vehicle 14 for helping to protect passenger side vehicle occupants.

The vehicle 14 includes at least one vehicle seat 20 for vehicle occupants 12. The vehicle 14 also includes a vehicle roof 22 and a side structure 24. The vehicle 14 has three rows of seating which help dictate the configuration of the side structure 24. In the example configuration shown in FIG. 1, the side structure 24 of the vehicle 14 includes two vehicle doors 26, three side windows 28, a roof rail 30, an A-pillar 32, a B-pillar 34, a C-pillar 36, and a D-pillar 38. The apparatus 10 can, however, be applied to vehicles having any number of rows, and thus any side structure configuration.

The curtain airbag 16 can be constructed of any suitable material, such as nylon (e.g., woven nylon 6-6 yarns), and can be constructed in any suitable manner. For example, the curtain airbag 16 may have a one-piece woven (OPW) construction in which the curtain airbag is woven as a single piece of material. As another example, the curtain airbag 16 can include more than one piece of material. If more than one piece is used, the pieces can be interconnected by known means, such as stitching, ultrasonic welding, heat bonding, or adhesives, to form the curtain airbag 16. The curtain airbag 16 can be uncoated, coated with a material, such as a gas impermeable urethane, or laminated with a material, such as a gas impermeable film. The curtain airbag 16 thus can have a gas-tight or substantially gas-tight construction.

Those skilled in the art will appreciate that alternative materials, such as polyester yarn, and alternatives coatings, such as silicone, can also be used to construct the curtain airbag 16.

An inflator 40 is operably connected to an inflatable volume 42 of the curtain airbag 16 in any known manner. The inflator 40 is actuatable to provide inflation fluid to the inflatable volume 42 of the curtain airbag 16 to inflate and deploy the curtain airbag from a stored condition, indicated by solid lines at 16 in FIG. 1, to a deployed condition, indicated by dashed lines at 16x in FIG. 1. The inflator 40 can be of any known type, such as stored gas, solid propellant, augmented, or hybrid. An airbag controller 44 can be operatively connected to the inflator 40 via lead wires 46. The airbag controller 44 is configured to actuate the inflator 40 in response to sensing the occurrence of an event for which occupant protection is desired, such as a collision or rollover.

As shown in the example configuration of FIG. 1, the curtain airbag 16 and the inflator 40 are mounted as a package 47 to a support structure 48 of the vehicle 14. At least a portion of the curtain airbag 16 is rolled and/or folded and contained in the support structure 48 when the curtain airbag is in the stored condition. The curtain airbag 16 is inflatable and deployable by the inflator 40 from the stored condition away from the support structure 48 and toward the deployed condition. In the deployed condition, the curtain airbag 16 is positioned between the side structure 24 and the vehicle occupant 12. The support structure 48 can be any structure in the vehicle 14 that will accommodate the curtain airbag 16 being deployed therefrom so that the deployed curtain airbag is positioned between the side structure 24 and the vehicle occupant 12. In the example configuration shown in FIG. 1, the support structure 48 is the roof rail 30.

Figure 3:
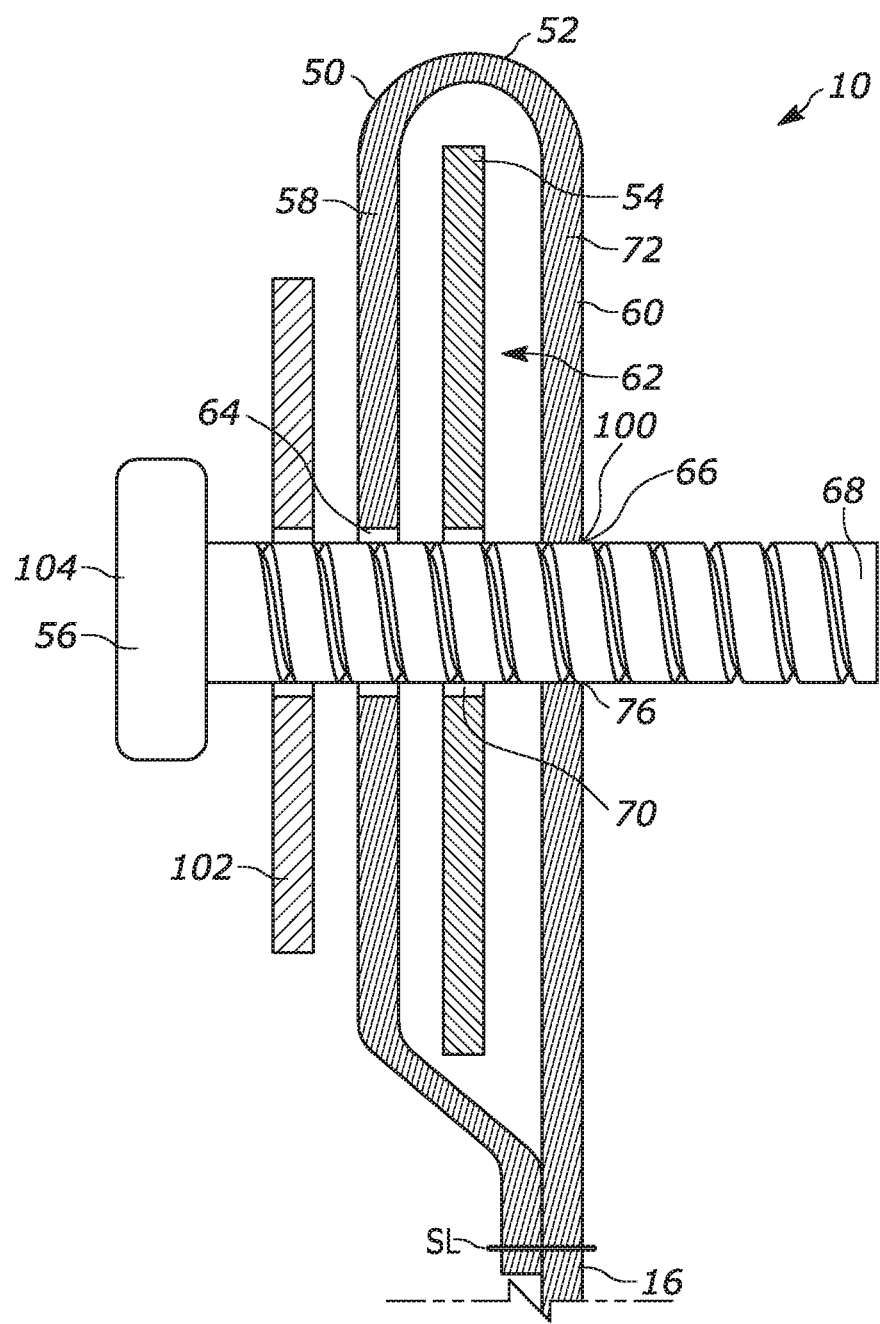
FIG. 3 is a sectional view of a portion of the apparatus of FIG. 1, according to the first configuration of the apparatus.

As shown in FIGS. 1 and 3, the curtain airbag 16 includes at least one mounting portion 50 that comprises a mounting tab 52 configured to receive a mounting bracket 54 and a fastener 56 for securing the curtain airbag and the mounting bracket to the roof rail 30. The mounting bracket 54 can be a generally rectangular plate (e.g., metal or plastic) with rounded corners/ends and a central opening 70. The mounting tab 52 has a two layer configuration in which first and second overlying layers 58, 60 are interconnected to define a pocket 62 that receives the mounting bracket 54. The first and second layers 58, 60 each include an opening 64, 66 that permits a shank 68 of the fastener 56 to pass through both the mounting tab 52 and the opening 70 when the mounting bracket 54 is positioned in the pocket 62. At least one of the openings 64, 66 in the mounting tab 52 can be configured to retain the fastener 56 positioned extending through the mounting tab and bracket 52, 54 so that the curtain airbag package 47 can be handled and moved into position in the vehicle 14 and mounted using the fasteners.

The mounting tab 52 is formed from a piece of airbag fabric 72 that extends from an upper edge 74 of the curtain airbag 16. For a multi-piece sewn construction of the curtain airbag 16, this piece of airbag fabric 72 can be formed integrally with an airbag panel or can be a separate piece connected to the curtain airbag, such as by stitching. The airbag fabric 72 can be folded over and interconnected (e.g., by stitching) to define the overlying layers 58, 60 and the pocket 62. For a one-piece woven (OPW) construction of the curtain airbag 16, the mounting tab 52 can be formed as an integral portion of the OPW construction in which the overlying layers 58, 60 are woven simultaneously and interwoven to define the pocket 62. In a hybrid OPW and stitched construction, a separate mounting tab 52 could also be sewn to an OPW curtain airbag 16.

Figure 2:
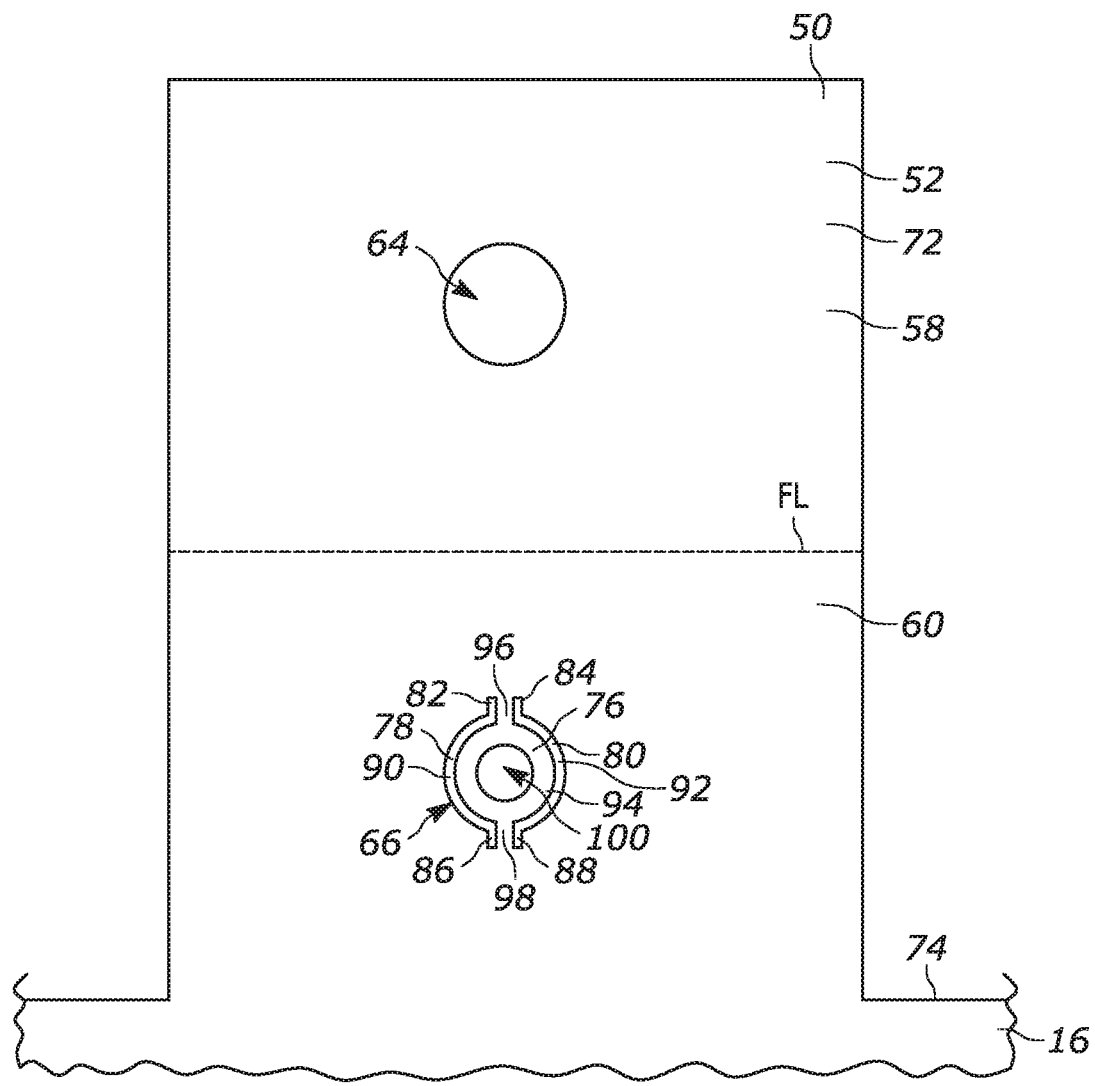
FIG. 2 is a plan view of a portion of the apparatus of FIG. 1, according to a first configuration of the apparatus.
Figure 4:
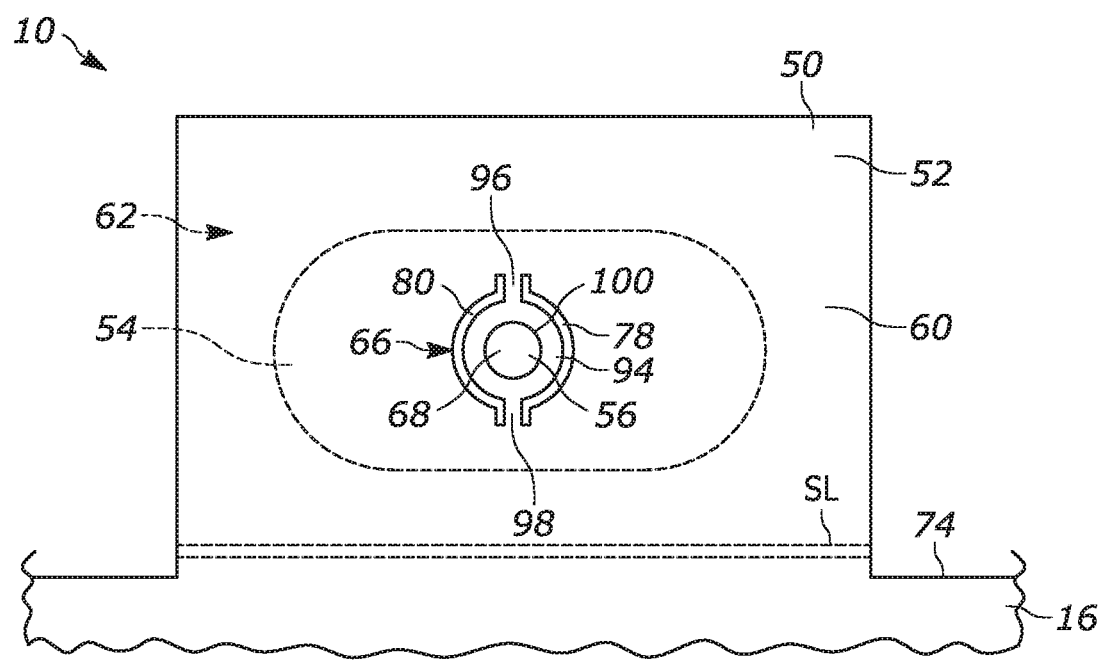
FIG. 4 is a plan view of the portion of the apparatus of FIG. 3.

In the example configuration illustrated in FIGS. 2-4, the airbag fabric 72 is folded along a fold line FL and stitched along a stitch line SL to define the first and second overlying layers 58, 60 and the pocket 62. The opening 64 in the first overlying layer 58 of the mounting tab 52 acts as a fastener receiving opening having a diameter sufficient to permit the fastener shank 68 to pass through freely. The opening 66 in the second overlying layer 60 of the mounting tab 52 acts as a fastener retainer 76 configured to receive and retain the shank 68 and thereby secure the fastener 56, once inserted, in the mounting tab. The fastener 56, being retained in the mounting tab 52 and passing through the opening 70 in the mounting bracket 54, also retains the mounting bracket in the pocket 62.

Advantageously, the configuration of the fastener retainer 76 allows for the elimination of additional mechanical fastening devices, such as push nuts, for retaining the fastener 56 in the mounting tab 52. As shown in the example configuration of FIG. 2, the fastener retainer 76 is partially defined by a pair of slots 78, 80 that extend through the second overlying layer 60. Each slot includes upper and lower ends 82, 84, 86, 88 that are generally straight or linear and a central portion 90, 92 that has a curved configuration in the manner of a semi-circle or ellipse. The slots 78, 80 are spaced from each other and positioned such that the upper and lower ends 82, 84, 86, 88 are adjacent, parallel, and closely spaced with each other, with the central portions 90, 92 extending away from each other.

The slots 78, 80 define between them the fastener retainer 76, which can be described as having a generally key-hole shape. The fastener retainer 76 has a round or circular central portion 94 defined by the central portions 90, 92 of the slots 78, 80. The central portion 94 of the fastener retainer 76 is connected to the remainder of the second overlying layer 60 only by upper and lower tabs 96, 98 defined by the upper and lower ends 82, 84, 86, 88 of the slots 78, 80. As such, the fastener retainer 76, to a large extent, can move or "float" between the slots 78, 80 relative to the remainder of the second overlying layer 60.

The fastener retainer 76 includes a central, circular retainer opening 100 that extends through the central portion 94 and is configured to receive the fastener 56. The retainer opening 100 has a diameter selected to form an interference with the fastener shank 68. The interference can be small or slight, so that installation of the fastener 56 does not tear the airbag fabric and so that installing the fastener is not too difficult. The interference needs only to be sufficient to hold the fastener 56 in the mounting tab during installation of the curtain airbag package 47 of the vehicle. The shank 68 can be installed through the retainer opening 100 without damaging the airbag fabric because 1) the fabric surrounding the retainer opening will stretch some to permit passage of the shank, and 2) the fastener shank is threaded and, because those threads are helical, the interference can be overcome by manually twisting, wiggling, etc. while applying an axial installation force to the fastener 56.

Although the fastener retainer 76 has been described as having a round or circular central portion 94 with upper and lower tabs 96, 98, it should be appreciated that the exact configuration of the fastener retainer is secondary to its ability to "float" relative to the remainder of the second overlying layer 60. Thus, the configuration of the fastener retainer 76 shown in FIGS. 2-4 illustrates just one example configuration for the fastener retainer. It should also be appreciated that the number and shape of the slots 78, 80 define the shape of the fastener retainer 76 as well as the number of tabs 96, 98 that connect the fastener retainer to the remainder of the second overlying layer 60. Accordingly, one or more slots 78, 80 can extend through the second overlying layer 60 and be shaped to define the fastener retainer 76 as having a circular, square, triangular, rectangular, elliptical, or any other shape, with one or more tabs 96, 98 connecting the fastener retainer to the remainder of the second overlying layer. The shape of the fastener retainer 76 and the number of tabs 96, 98 can thus vary as long as the fastener retainer is constructed such that it can move/float relative to the remainder of the second overlying layer 60.

Referring to FIG. 3, when the fastener 56 is installed, the shank 68 passes through the fastener receiving opening 64 in the first overlying layer 58 and the retainer opening 100 of the second overlying layer 60. The shank 68 also passes through the pocket 62 and the opening 70 of the mounting bracket 54 positioned therein. As shown in FIG. 3, a washer 102 can also be installed between the mounting tab 52 and a head 104 of the fastener 56. In this installed condition, the fastener retainer 76 not only retains the fastener 56 in the mounting tab 52, it also retains the mounting bracket 54 in the pocket 62 and the washer 102 on the fastener.

Advantageously, as a result of its ability to move/float relative to the remainder of the second overlying layer 60, the fastener retainer 76 provides the fastener 56 with freedom to shift, twist, or otherwise move relative to the mounting tab 52. This eases the installation process for the curtain airbag 16/curtain airbag package 47 as there is provided at least some amount of play between the threaded shank 68 of the fastener 56 and the mounting tab 52, which can assist a worker in localizing the fastener in a corresponding mounting hole on the vehicle 14.

Figure 5:
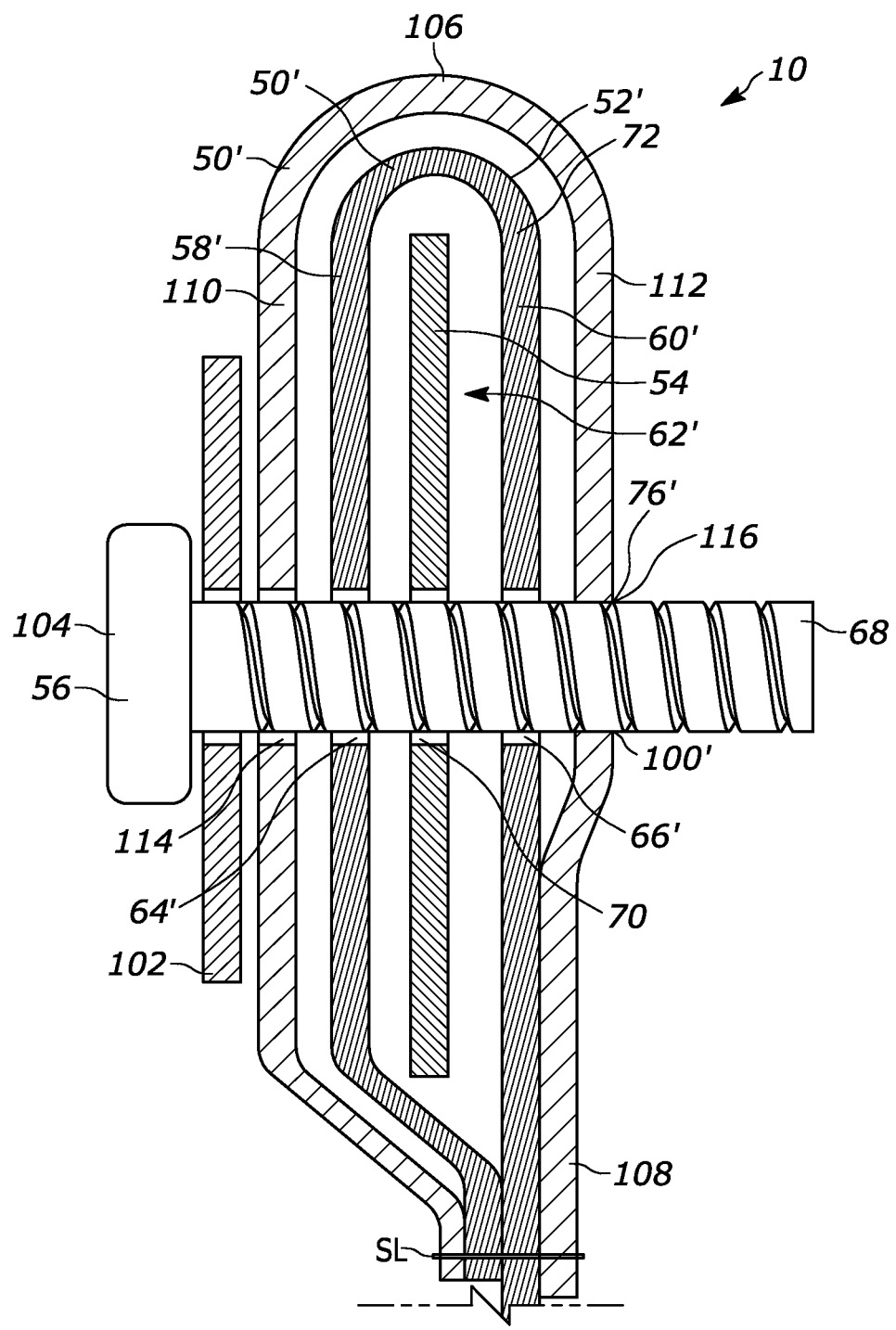
FIG. 5 is a sectional view of a portion of the apparatus of FIG. 1, according to a second configuration of the apparatus.
Figure 6:
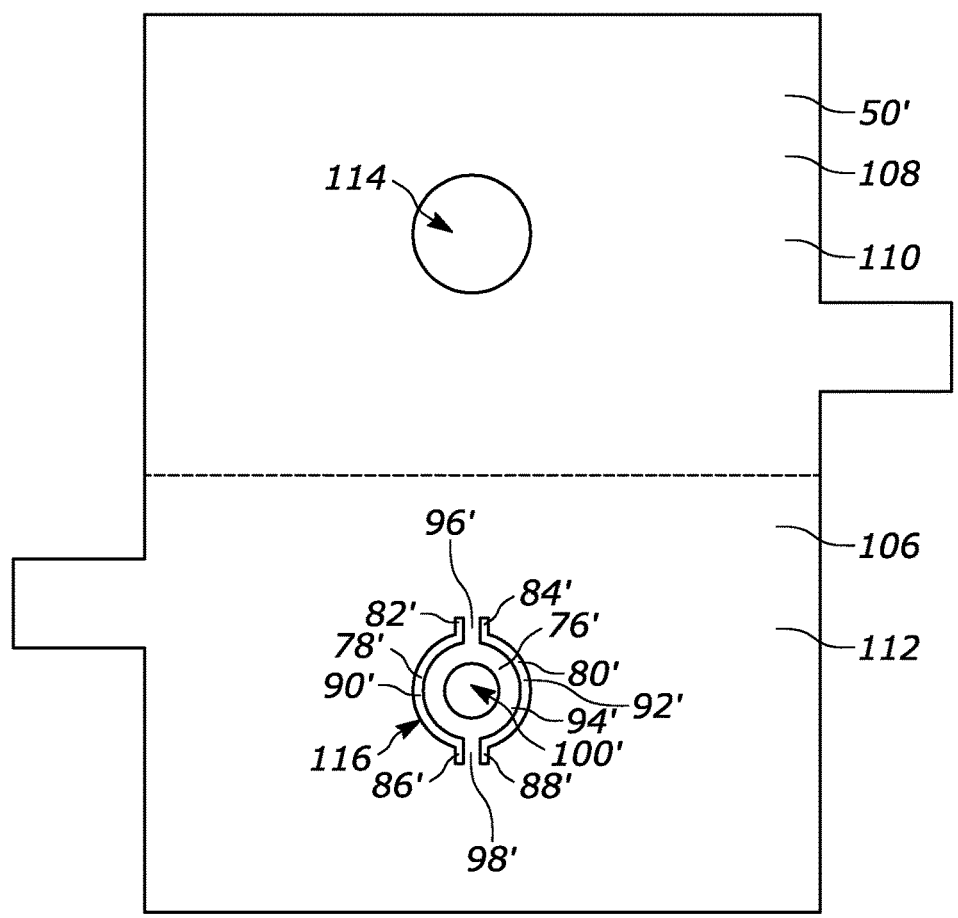
FIG. 6 is a plan view of a portion of the apparatus of FIG. 5 in a first condition.
Figure 7:
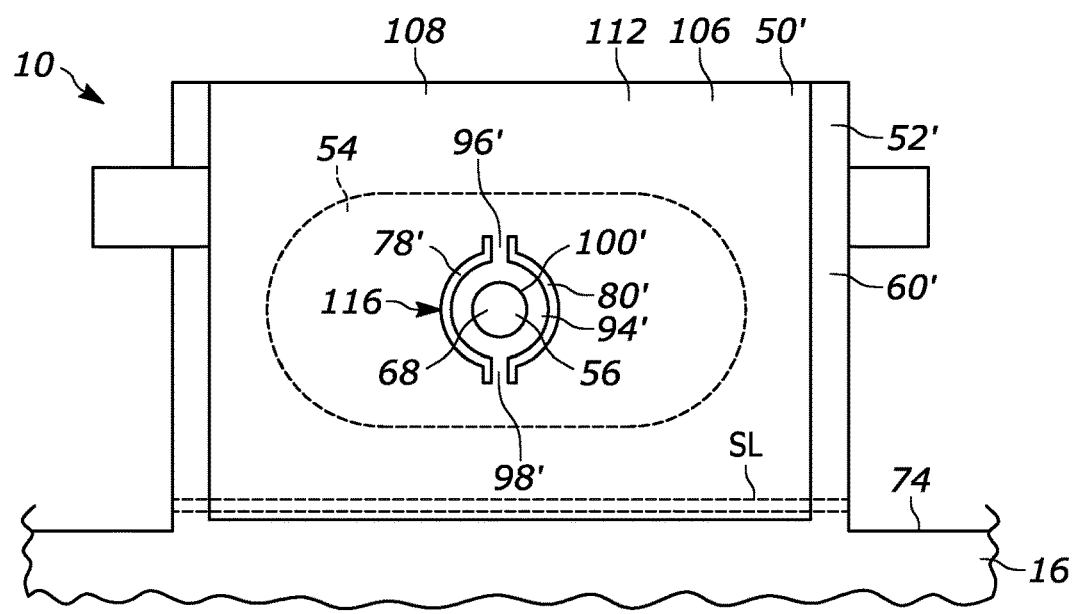
FIG. 7 is a plan view of the apparatus of FIG. 5 in a second condition.

FIGS. 5-7 depict another configuration for the fabric mounting portion 50' of the apparatus 10, which may differ from that shown in FIGS. 2-4. Therefore, structures of FIGS. 5-7 that are the same as or similar to those described with reference to FIGS. 2-4 are either unnumbered or have the same reference numbers with the addition of a "prime" mark ('). Description of common elements and operation similar to those in the previously described configuration may not be repeated with respect to the configuration of FIGS. 5-7, for brevity.

As shown in FIG. 5, the mounting portion 50' of FIGS. 5-7 differs from the mounting portion 50 of FIGS. 2-4 in that it comprises a reinforcement tab 106 having the fastener retainer 76' formed therein. In this configuration, each of the first and second overlying layers 58', 60' of the mounting tab 52' include a fastener receiving opening 64', 66'. The reinforcement tab 106 is formed from a separate length of fabric material 108 that is connected, such as by stitching, to the curtain airbag 16.

In the example configuration illustrated in FIGS. 5-7, the reinforcement tab 106 is folded along a fold line FL and stitched along a stitch line SL to define the first and second overlying layers 110, 112 and to connect the reinforcement tab to the mounting tab 52'. In the example configuration shown in FIG. 5, the reinforcement tab 106 is thus wrapped about the mounting tab 52'. As shown in the example configuration of FIGS. 5-7, the first overlying layer 110 of the reinforcement tab 106 includes an opening 114 that acts as a fastener receiving opening having a diameter sufficient to permit the fastener shank 68 to pass through freely. The second overlying layer 112 of the reinforcement tab 106 includes an opening 116 that acts as the fastener retainer 76' configured to receive and retain the shank 68 and thereby secure the fastener 56, once inserted, in the mounting and reinforcement tabs 52', 106.

As shown in FIGS. 6-7, the fastener retainer 76' in the second overlying layer 112 of the reinforcement tab 106 can have the same configuration as the fastener retainer 76 in the second overlying layer 60 of the mounting tab 52 described above. The fastener retainer 76' can thus have a central portion 94' connected to the remainder of the second overlying layer 112 of the reinforcement tab 106 and to the mounting tab 52', through its connection to the reinforcement tab, only by upper and lower tabs 96', 98'. As such, the fastener retainer 76', to a large extent, is movable or "floats" between the slots 78', 80' relative to the remainder of the reinforcement tab 106 and relative to the mounting tab 52'. Advantageously, the fastener retainer 76' provides the fastener 56 with freedom to shift, twist, or otherwise move relative to the mounting tab 52.

Although the fastener retainer 76' has been shown in FIGS. 5-7 as being formed in the second overlying layer 112 of the reinforcement tab 106, the fastener retainer can instead, or additionally, be formed in the first overlying layer 110 of the reinforcement tab, the first overlying layer 58' of the mounting tab 52', and/or the second overlying layer 60' of the mounting tab. Further, although the reinforcement tab 106 has been described being wrapped about the mounting tab 52', the reinforcement tab can be stitched or otherwise connected to only one of the first and second overlying layers 58', 60' of the mounting tab. As an example, the reinforcement tab 106 can comprise only the second overlying layer 112 having the retainer portion 76' formed therein and be attached to only the second overlying layer 60' of the mounting tab 52'.

When the apparatus 10 is secured to the support structure 48 of the vehicle 14, the second overlying layer 60 of the mounting portion 50 of FIGS. 2-4, when present, and/or the second overlying layer 112 of the mounting portion 50' of FIGS. 5-7, when present, can directly contact the support structure. This contact can be referred to as a fabric-on-metal contact between a mounting portion 50, 50' and the support structure 48. It may, however, be more desirable in certain vehicle models to have a metal-on-metal contact between a mounting portion 50, 50' and the support structure 48 than the fabric-on-metal contact.

Figure 8:
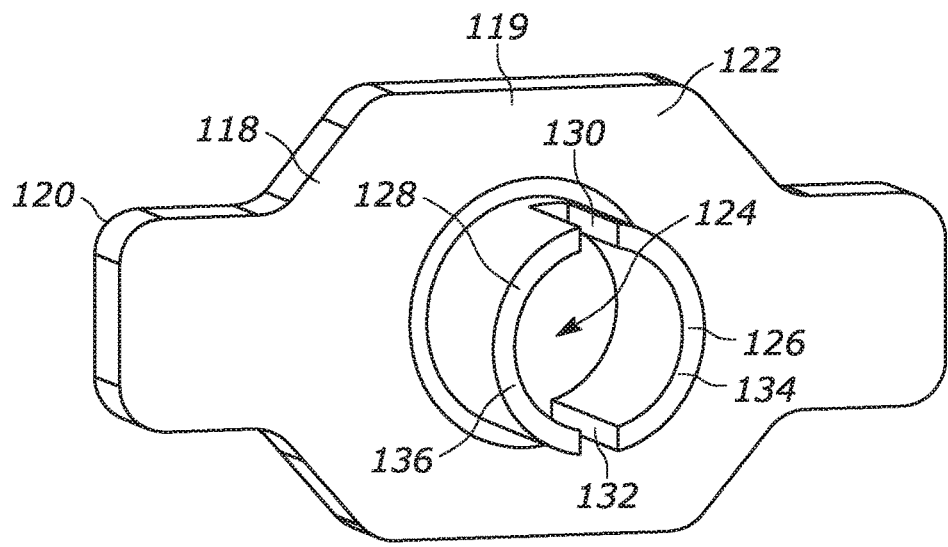
FIG. 8 is a perspective view of a mounting bracket of the apparatus of FIG. 1, according to a third configuration of the apparatus.

FIG. 8 depicts a modified mounting bracket 118 that is made from metal to provide for a metal-on-metal contact between a mounting portion 50, 50' and a metal support structure 48. The mounting bracket 118 includes a plate 119 having oppositely facing first and second surfaces 120, 122 with an opening 124, which is similar to the opening 70 of mounting bracket 54 of FIGS. 2-4, extending between the first and second surfaces. First and second legs 126, 128, which are separated from one another by slots 130, 132, extend from the second surface 122 of the plate 119. Although the mounting bracket 118 is depicted in FIG. 8 as having a "plus sign" or "winged" shape, the mounting bracket can be circular, square, triangular, rectangular, elliptical, or any other shape.

Figure 9:
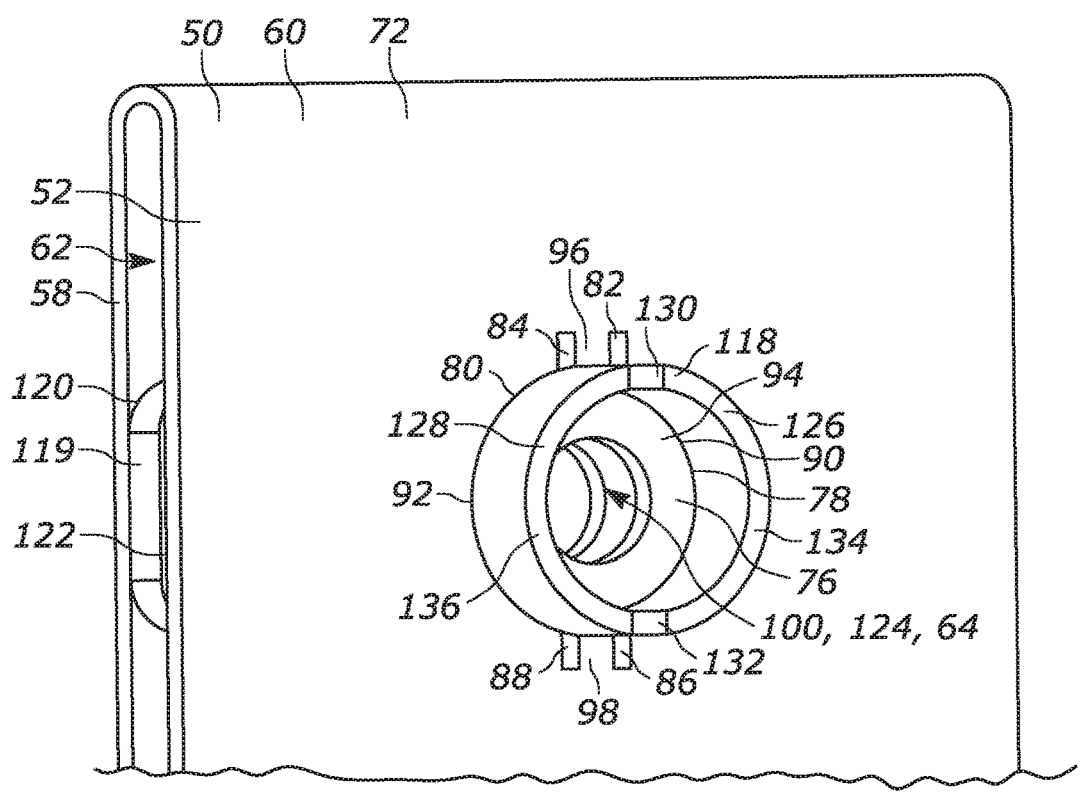
FIG. 9 is a perspective view of a portion of the apparatus of FIG. 1, including the mounting bracket of FIG. 8.

FIG. 9 depicts the mounting bracket 118 assembled in the first configuration of the mounting portion 50 in place of the mounting bracket 54 of FIGS. 2-4. As shown in FIG. 9, the first and second legs 126, 128 are configured to be received in the first and second slots 78, 80. Each of the slots 78, 80 has dimensions selected to form an interference with the legs 126, 128. The interference can be small or slight, so that installation of the legs 126, 128 does not tear the airbag fabric of the second overlying layer 60 of the mounting tab 52. The interference needs only to be sufficient to hold the legs 126,128 in the mounting tab 52 during installation of the curtain airbag package 47. The legs 126,128 can be installed through the slots 78, 80 without damaging the airbag fabric because the fabric surrounding the slots will allow some stretching or movement to permit passage of the legs. Although the legs 126, 128 are shown as only extending through the central portions 90, 92 of the slots 78, 80, the legs can be configured to also extend through the upper and lower ends 82, 84, 86, 88 of the slots.

When the legs 126,128 are inserted through the slots 78, 80, the upper and lower tabs 96, 98 are received in the slots 130, 132 between the legs, and the opening 124 in the mounting bracket 118 is aligned with the retainer opening 100 for receiving a fastener 56. As shown in FIG. 9, the legs 126, 128 are configured to extend beyond the slots 78, 80 so that terminal end portions 134, 136 of the legs contact the support structure 48 when the mounting portion 50 is secured to the support structure. The legs 126, 128 of the metal mounting bracket 118 contacting the metal support structure 48 provides the desired metal-on-metal contact between the mounting portion 50 and the metal support structure.

Figure 10:
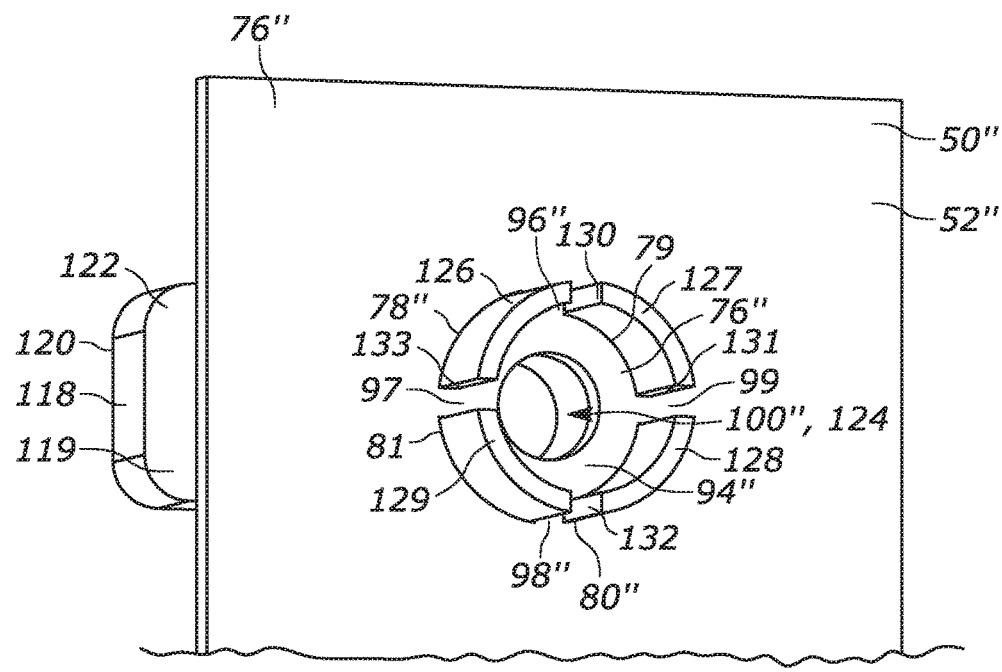
FIG. 10 is a perspective view of a portion of the apparatus of FIG. 1, according to a fourth configuration of the apparatus.

Although not shown, mounting bracket 118 can also be assembled with the second configuration of the mounting portion 50' illustrated in FIGS. 5-7 in a similar manner as describe above. Further, although the mounting bracket 118 has been shown as having two legs 126, 128, the mounting bracket can have any number of legs in order to cooperate with a selected mounting portion configuration and/or fastener retainer configuration. For example, FIG. 10 depicts another configuration for the fabric mounting portion 50" of the apparatus 10, which may differ from those shown in FIGS. 2-4 and FIGS. 5-7. Therefore, structures of FIG. 10 that are the same as or similar to those described with reference to FIGS. 2-4 and FIGS. 5-7 are either unnumbered or have the same reference numbers with the addition of a "double prime" mark ("). Description of common elements and operation similar to those in the previously described configuration may not be repeated with respect to the configuration of FIG. 10, for brevity.

As shown in FIG. 10, the mounting portion 50" differs from the mounting portion 50 of FIGS. 2-4 in that the mounting tab 52" has a one layer configuration with the fastener retainer 76" formed therein. The fastener retainer 76" is defined by four arcuate slots 78", 79, 80", 81 that are spaced from one another. The slots 78", 79, 80", 81 define between them the fastener retainer 76". Similar to the fastener retainers 76, 76' described above, the fastener retainer 76" of FIG. 10 has a round or circular central portion 94" that is defined by the slots 78", 79, 80", 81 and is connected to the remainder of the mounting tab 52" by upper and lower tabs 96", 98" defined by the slots. However, unlike the fastener retainers 76, 76' described above, the central portion 94" of the fastener retainer 76" is also connected to the remainder of the mounting tab 52" by first and second central tabs 97, 99 defined by the slots 78", 79, 80", 81.

As shown in FIG. 10, in order to cooperate with the mounting portion 50" and the fastener retainer 76", the mounting bracket 118 can have four legs 126, 127, 128, 129, which are separated from one another by slots 130, 131, 132, 133. Each of the legs 126, 127, 128, 129 is configured to be received and interferencingly fit in a corresponding slot 78", 79, 80", 81. When the legs 126, 127, 128, 129 are received in the slots 78", 79, 80", 81, the tabs 96", 97, 98", 99 are received in the slots 130, 131, 132, 133 between the legs, and the opening 124 in the mounting bracket 118 is aligned with the retainer opening 100" for receiving a fastener 56.

Figure 11:
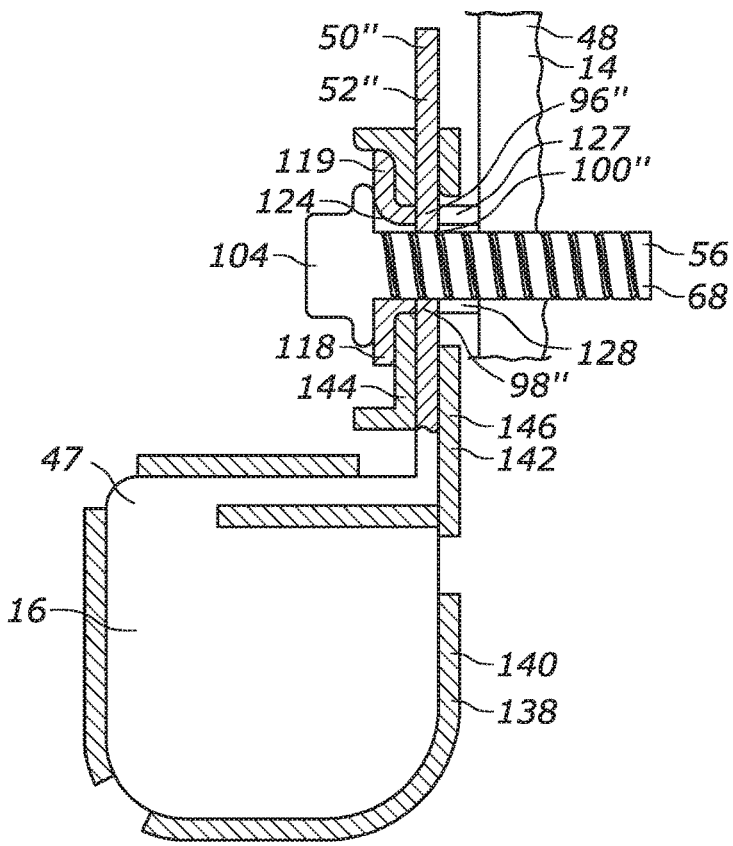
FIG. 11 is a sectional view of a portion of the apparatus of FIG. 1, that includes the portion of FIG. 10.

As shown in FIG. 11, the mounting bracket 118 can also cooperate with a package holder 138 that helps mount the curtain airbag 16 and the inflator 40 in the vehicle 14 as a package 47. As shown in the example configuration of FIG. 11, the package holder 138 has a holding portion 140 for holding the inflator 40 and/or the rolled and/or folded curtain airbag 16. The package holder 138 also includes a two layer mounting portion 142 having first and second overlying layers 144, 146. When the curtain airbag 16 is joined to the package holder 138, the mounting tab 52" is positioned between the first and second overlying layers 144, 146 of the mounting portion 142. The mounting bracket 118 extends through the mounting tab 52" as described above, and through the mounting portion 142 of the package holder 138 so that there is metal-to-metal contact between the mounting portion 50" and the support structure 48 of the vehicle. The fastener 56 extends through each of the mounting bracket 118, the package holder 138, the mounting tab 52", and the support structure 48 to mount the apparatus 10 to the vehicle 14. Although the mounting portion 50" and the mounting bracket 118 of FIG. 10 is shown in FIG. 11 cooperating with the package holder 138, any mounting portion configuration and/or mounting bracket configuration, whether expressly described herein or not, can cooperate with the package holder.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for connecting a curtain airbag to a vehicle, comprising:
   a fabric mounting portion formed from or connected to the curtain airbag; and
   a fastener for mounting the curtain airbag to the vehicle;
   wherein the mounting portion comprises:
      a fastener retainer for retaining the fastener in the mounting portion during installation of the curtain airbag in the vehicle, the fastener retainer being formed from the mounting portion fabric and defined by one or more slots that extend through the mounting portion fabric, leaving the fastener retainer connected to the remainder of the mounting portion by one or more tabs, and
      a retainer opening extending through the fastener retainer and sized to form an interference fit with the fastener so that the fastener retainer holds the fastener;
   wherein the one or more tabs in combination with the one or more slots permits the fastener retainer to move relative to the remainder of the mounting portion.

2. The apparatus of claim 1, wherein the mounting portion comprises a mounting tab formed from airbag fabric extending from an upper edge of the curtain airbag, the mounting tab comprising first and second overlying layers of the airbag fabric, at least one of the first and second overlying layers having an opening extending therethrough for receiving the fastener.

3. The apparatus of claim 2, wherein the first overlying layer has the opening extending therethrough for receiving the fastener, and the second overlying layer has the fastener retainer formed therein.

4. The apparatus of claim 2, wherein a shank of the fastener extends through the opening in the first overlying layer and the retainer opening, wherein a diameter of the opening in the first overlying layer permits the shank of the fastener to pass through freely, and wherein a diameter of the retainer opening is sized to form an interference with the shank.

5. The apparatus of claim 2, wherein the one or more tabs in combination with the one or more slots permits the fastener retainer to move relative to the remainder of the mounting tab, and wherein as a result of the fastener retainer being movable relative to the mounting tab, the fastener is movable relative to the mounting tab while the retainer opening retains the fastener extending through the mounting tab.

6. The apparatus of claim 2, wherein the mounting portion further comprises a reinforcement tab formed from a separate length of fabric material and comprising first and second overlying layers, the first overlying layer of the reinforcement tab having an opening for receiving the fastener, the second overlying layer of the reinforcement tab having the fastener retainer formed therein, and wherein the reinforcement tab is connected to the mounting tab so that the fastener extends through each of the mounting and reinforcement tabs.

7. The apparatus of claim 6, wherein each of the first and second overlying layers has openings extending therethrough for receiving the fastener, wherein diameters of the openings in the first and second overlying layers permit a shank of the fastener to pass through freely, and wherein a diameter of the retainer opening is sized to form an interference with the shank.

8. The apparatus of claim 7, wherein the fastener, as a result of the fastener retainer being movable relative to the remainder of the mounting portion, is movable relative to the remainder of the mounting portion while the retainer opening retains the fastener in the mounting portion.

9. The apparatus of claim 1, wherein the mounting portion further comprises a reinforcement tab formed from a separate length of fabric material that is connected to the curtain airbag, the reinforcement tab having the fastener retainer formed therein.

10. The apparatus of claim 1, wherein the fastener retainer is defined by a pair of slots that extend through the mounting portion fabric, the fastener retainer being movable between the slots relative to the remainder of the mounting portion.

11. The apparatus of claim 10, wherein each slot has upper and lower ends that are straight or linear and a central portion that has a curved configuration, wherein the fastener retainer is defined by the central portions of the slots to have a circular configuration, and wherein the one or more tabs are defined by the upper and lower ends of the slots to be upper and lower tabs.

12. The apparatus of claim 10, wherein the fastener, as a result of the fastener retainer being movable relative to the remainder of the mounting portion, is movable relative to the remainder of the mounting portion while the fastener retainer retains the fastener in the mounting portion.

13. The apparatus of claim 10, wherein the pair of slots define upper and lower tabs that connect the fastener retainer to the remainder of the mounting portion.

14. The apparatus of claim 1, further comprising a mounting bracket, the mounting bracket comprising a plate having oppositely facing first and second surfaces and an opening extending between the first and second surfaces for receiving the fastener, the mounting bracket having at least one leg extending from the second surface of the plate, and wherein the at least one leg is configured to be received in and extend beyond the one or more slots so that a portion of the at least one leg contacts the vehicle when the curtain airbag is mounted to the vehicle.

15. The apparatus of claim 14, wherein the fastener retainer is defined by a plurality of slots that extend through the mounting portion fabric, leaving the fastener retainer connected to the remainder of the mounting portion by a plurality of tabs, wherein the mounting bracket has a plurality of legs, each of the legs being separated from an adjacent leg by a slot in the mounting bracket, and wherein the tabs are configured to be received in the slots of the mounting bracket when the legs are received in the slots in the mounting portion fabric.

16. The apparatus of claim 14, further comprising a package holder having a holding portion for holding the curtain airbag in a rolled and/or folded condition and a mounting portion for mounting the curtain airbag to the vehicle, wherein the mounting portion of the package holder is adjacent to the mounting portion fabric when joined to the curtain airbag, and wherein the at least one leg of the mounting bracket is configured to extend through the one or more slots and the mounting portion of the package holder so that a portion of the at least one leg contacts the vehicle when the curtain airbag is mounted to the vehicle.

17. An apparatus for connecting a curtain airbag to a vehicle, comprising:
   a fabric mounting portion formed from or connected to the curtain airbag;
   a fastener for mounting the curtain airbag to the vehicle; and
   a mounting bracket comprising a plate having oppositely facing first and second surfaces and an opening extending between the first and second surfaces for receiving the fastener, the mounting bracket having at least one leg extending from the second surface of the plate;
   wherein the mounting portion comprises:
      a fastener retainer for retaining the fastener in the mounting portion during installation of the curtain airbag in the vehicle, the fastener retainer being formed from the mounting portion fabric and defined by one or more slots that extend through the mounting portion fabric, leaving the fastener retainer connected to the remainder of the mounting portion by one or more tabs,
      a retainer opening extending through the fastener retainer and sized to form an interference fit with the fastener so that the fastener retainer holds the fastener; and
   wherein the at least one leg of the mounting bracket is configured to be received in and extend beyond the one or more slots so that a portion of the at least one leg contacts the vehicle when the curtain airbag is mounted to the vehicle.

18. The apparatus of claim 17, wherein the fastener retainer is defined by a plurality of slots that extend through the mounting portion fabric, leaving the fastener retainer connected to the remainder of the mounting portion by a plurality of tabs, wherein the mounting bracket has a plurality of legs, each of the legs being separated from an adjacent leg by a slot in the mounting bracket, and wherein the tabs are configured to be received in the slots of the mounting bracket when the legs are received in the slots in the mounting portion fabric.

19. The apparatus of claim 17, further comprising a package holder having a holding portion for holding the curtain airbag in a rolled and/or folded condition and a mounting portion for mounting the curtain airbag to the vehicle, wherein the mounting portion of the package holder is adjacent to the mounting portion fabric when joined to the curtain airbag, and wherein the at least one leg of the mounting bracket is configured to extend through the one or more slots and the mounting portion of the package holder so that a portion of the at least one leg contacts the vehicle when the curtain airbag is mounted to the vehicle.

* * * * *